United States Patent
Pandya et al.

(10) Patent No.: US 12,211,027 B2
(45) Date of Patent: *Jan. 28, 2025

(54) IN-PERSON TRANSACTION PROCESSING SYSTEM

(71) Applicant: eBay Inc., San Jose, CA (US)

(72) Inventors: Dhiral Vinaykumar Pandya, Santa Clara, CA (US); Zhe Sun, San Jose, CA (US); Azeem Sattar, San Jose, CA (US); Suman Nagakumar Goud, San Jose, CA (US); GyeongGu Kang, San Jose, CA (US); Aditya Tuteja, San Jose, CA (US); Aaquib Mohammad, San Jose, CA (US); Zhe Yu, San Jose, CA (US); Zhili Huang, Milpitas, CA (US)

(73) Assignee: EBAY INC., San Jose, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/846,557

(22) Filed: Jun. 22, 2022

(65) Prior Publication Data
US 2022/0327515 A1 Oct. 13, 2022

Related U.S. Application Data

(63) Continuation of application No. 16/787,835, filed on Feb. 11, 2020, now Pat. No. 11,392,924.
(Continued)

(51) Int. Cl.
*G06Q 30/00* (2023.01)
*G06F 16/955* (2019.01)
(Continued)

(52) U.S. Cl.
CPC ..... *G06Q 20/3274* (2013.01); *G06F 16/9554* (2019.01); *G06F 16/958* (2019.01);
(Continued)

(58) Field of Classification Search
None
See application file for complete search history.

(56) References Cited

U.S. PATENT DOCUMENTS

| | | | | |
|---|---|---|---|---|
| 5,799,285 A | * | 8/1998 | Klingman | G06Q 20/00 379/93.12 |
| 5,893,904 A | * | 4/1999 | Harris | G06Q 30/0613 705/26.41 |

(Continued)

FOREIGN PATENT DOCUMENTS

| | | |
|---|---|---|
| CN | 108985769 | 12/2018 |
| CN | 112488695 | 3/2021 |

(Continued)

OTHER PUBLICATIONS

· IGI Global. QR Code Advertisements in Tourism Marketing. (2017). Retrieved online Sep. 15, 2021. https://www.igi-global.com/chapter/qr-code-advertisements-in-tourism-marketing/177050 (Year: 2017).*

(Continued)

*Primary Examiner* — James A Reagan
(74) *Attorney, Agent, or Firm* — SCHWEGMAN LUNDBERG & WOESSNER, P.A.

(57) ABSTRACT

Systems and methods for managing an in-person transaction process are provided. In example embodiments, a network system receives, from a first user device, information regarding a service or an item. Using the received information, the network system generates an unpublished listing and associates the unpublished listing with a session identifier. The unpublished listing is temporarily stored to a datastore. The network system then generates a scannable code that provides a uniform resource identifier (URI) associated with the session identifier. The scannable code is presented on the first user device, whereby the scannable code can be scanned by a second user device to access, via the URI, a transaction (Continued)

user interface associated with the session identifier. In response to a request to access the transaction user interface triggered by the second user device scanning the scannable code, the transaction user interface is displayed on the second user device.

20 Claims, 10 Drawing Sheets

Related U.S. Application Data

(60) Provisional application No. 62/899,060, filed on Sep. 11, 2019.

(51) Int. Cl.
| | | |
|---|---|---|
| *G06F 16/958* | (2019.01) | |
| *G06Q 20/10* | (2012.01) | |
| *G06Q 20/32* | (2012.01) | |
| *G06Q 30/0207* | (2023.01) | |
| *G06Q 30/0601* | (2023.01) | |
| *G06Q 40/12* | (2023.01) | |
| *G06F 3/0482* | (2013.01) | |
| *G06K 7/14* | (2006.01) | |
| *H04L 101/385* | (2022.01) | |

(52) U.S. Cl.
CPC ....... *G06Q 20/108* (2013.01); *G06Q 20/3276* (2013.01); *G06Q 30/0222* (2013.01); *G06Q 30/0643* (2013.01); *G06Q 40/12* (2013.12); *G06F 3/0482* (2013.01); *G06K 7/1417* (2013.01); *H04L 2101/385* (2022.05)

(56) References Cited

U.S. PATENT DOCUMENTS

| | | | | |
|---|---|---|---|---|
| 6,466,965 | B1* | 10/2002 | Chessell | G06F 9/466 |
| | | | | 718/101 |
| 7,149,718 | B1* | 12/2006 | Wilson | G06Q 30/0633 |
| | | | | 705/37 |
| 7,756,776 | B2* | 7/2010 | Wilson | G06Q 30/0601 |
| | | | | 705/37 |
| 8,050,981 | B2* | 11/2011 | Wilson | G06Q 30/08 |
| | | | | 705/26.81 |
| 8,769,304 | B2* | 7/2014 | Kirsch | G06Q 20/0855 |
| | | | | 713/189 |
| 9,582,810 | B2* | 2/2017 | Wingle | G06Q 30/0241 |
| 9,734,498 | B2* | 8/2017 | Itwaru | G06Q 30/02 |
| 11,113,730 | B1* | 9/2021 | Birkett | G06N 5/04 |
| 11,392,924 | B2 | 7/2022 | Pandya et al. | |
| 2002/0077976 | A1* | 6/2002 | Meyer | G06Q 20/14 |
| | | | | 705/40 |
| 2007/0021969 | A1* | 1/2007 | Homeier-Beals | G06Q 20/20 |
| | | | | 705/16 |
| 2009/0320106 | A1* | 12/2009 | Jones | G06Q 40/02 |
| | | | | 726/5 |
| 2010/0008535 | A1* | 1/2010 | Abulafia | G06Q 20/14 |
| | | | | 705/30 |
| 2010/0312694 | A1* | 12/2010 | Homeier-Beals | G06Q 20/10 |
| | | | | 705/39 |
| 2011/0202471 | A1* | 8/2011 | Scott | G06Q 30/0278 |
| | | | | 705/306 |
| 2012/0323717 | A1* | 12/2012 | Kirsch | G06F 21/31 |
| | | | | 705/26.1 |
| 2013/0124413 | A1 | 5/2013 | Itwaru | |
| 2013/0132234 | A1* | 5/2013 | Grossi | G06Q 20/327 |
| | | | | 705/26.41 |
| 2013/0179336 | A1* | 7/2013 | Lyons | G06Q 20/3276 |
| | | | | 705/39 |
| 2014/0089125 | A1* | 3/2014 | Kinnersley | G06Q 50/01 |
| | | | | 705/26.3 |
| 2014/0095282 | A1* | 4/2014 | Slonimsky | G06Q 30/0261 |
| | | | | 705/14.19 |
| 2014/0095310 | A1* | 4/2014 | Slonimsky | G06Q 30/0261 |
| | | | | 705/14.54 |
| 2014/0304077 | A1* | 10/2014 | Wingle | G06Q 30/0241 |
| | | | | 705/14.61 |
| 2015/0046237 | A1* | 2/2015 | Slonimsky | G06Q 30/0261 |
| | | | | 705/14.16 |
| 2015/0348015 | A1* | 12/2015 | Ren | G06Q 20/085 |
| | | | | 705/41 |
| 2016/0203352 | A1* | 7/2016 | Marsico | G16H 20/60 |
| | | | | 235/375 |
| 2016/0343050 | A1* | 11/2016 | D'Souza | G06Q 30/0605 |
| 2019/0026820 | A1* | 1/2019 | Adolphe | G06Q 10/06393 |
| 2019/0132372 | A1* | 5/2019 | Litsyn | H04L 67/12 |
| 2019/0312849 | A1* | 10/2019 | Khassanov | H04L 63/0428 |
| 2021/0073785 | A1 | 3/2021 | Pandya et al. | |

FOREIGN PATENT DOCUMENTS

| | | | | |
|---|---|---|---|---|
| KR | 20200013208 | | 2/2020 | |
| KR | 20200013208 | A * | 2/2020 | G06F 9/44 |
| WO | 2019089970 | | 5/2019 | |
| WO | WO-2019089970 | A1 * | 5/2019 | G09B 5/062 |

OTHER PUBLICATIONS

· G.D. Palmer. "Once Something Is Sold on Craigslist Does the Ad Go Away?" (Aug. 28, 2012). Retrieved online Mar. 3, 2022. https://yourbusiness.azcentral.com/once-something-sold-craigslist-ad-away-6901.html (Year: 2012).*
"European Application Serial No. 20193602.8, Extended European Search Report mailed Feb. 5, 2021", 8 pgs.
"U.S. Appl. No. 16/787,835, Non Final Office Action mailed Sep. 20, 2021", 21 pgs.
"IGI Global. QR Code Advertisements in Tourism Marketing", https:www.igi-global.com chapter qr-code-advertisements-in-tourism-marketing 177050, (2017).
"U.S. Appl. No. 16/787,835, Examiner Interview Summary mailed Dec. 17, 2021", 2 pgs.
"U.S. Appl. No. 16/787,835, Response filed Dec. 20, 2021 to Non Final Office Action mailed Sep. 20, 2021", 12 pgs.
"U.S. Appl. No. 16/787,835, Final Office Action mailed Dec. 29, 2021", 18 pgs.
"U.S. Appl. No. 16/787,835, Response filed Feb. 11, 2022 to Final Office Action mailed Dec. 29, 2021", 11 pgs.
"U.S. Appl. No. 16/787,835, Examiner Interview Summary mailed Feb. 14, 2022", 2 pgs.
"U.S. Appl. No. 16/787,835, Notice of Allowance mailed Mar. 16, 2022", 12 pgs.
Palmer, G D, "Once Something Is Sold on Craigslist Does the Ad Go Away?", https: yourbusiness.azcentral.com once-something-sold-craigslist-ad-away-6901 .html, (Aug. 28, 2012).
U.S. Appl. No. 16/787,835 U.S. Pat. No. 11,392,924, filed Feb. 11, 2020, In-Person Transaction Processing System.
"Chinese Application Serial No. 202010947673.3, Office Action mailed Dec. 26, 2023", With English Machine Translation, 27 pgs.
"Chinese Application Serial No. 202010947673.3, Response filed May 10, 2024 to Office Action mailed Dec. 26, 2023", W English Claims, 13 pgs.
"Chinese Application Serial No. 202010947673.3, Decision of Rejection mailed Jun. 29, 2024", With English Machine Translation, 21 pgs.

* cited by examiner

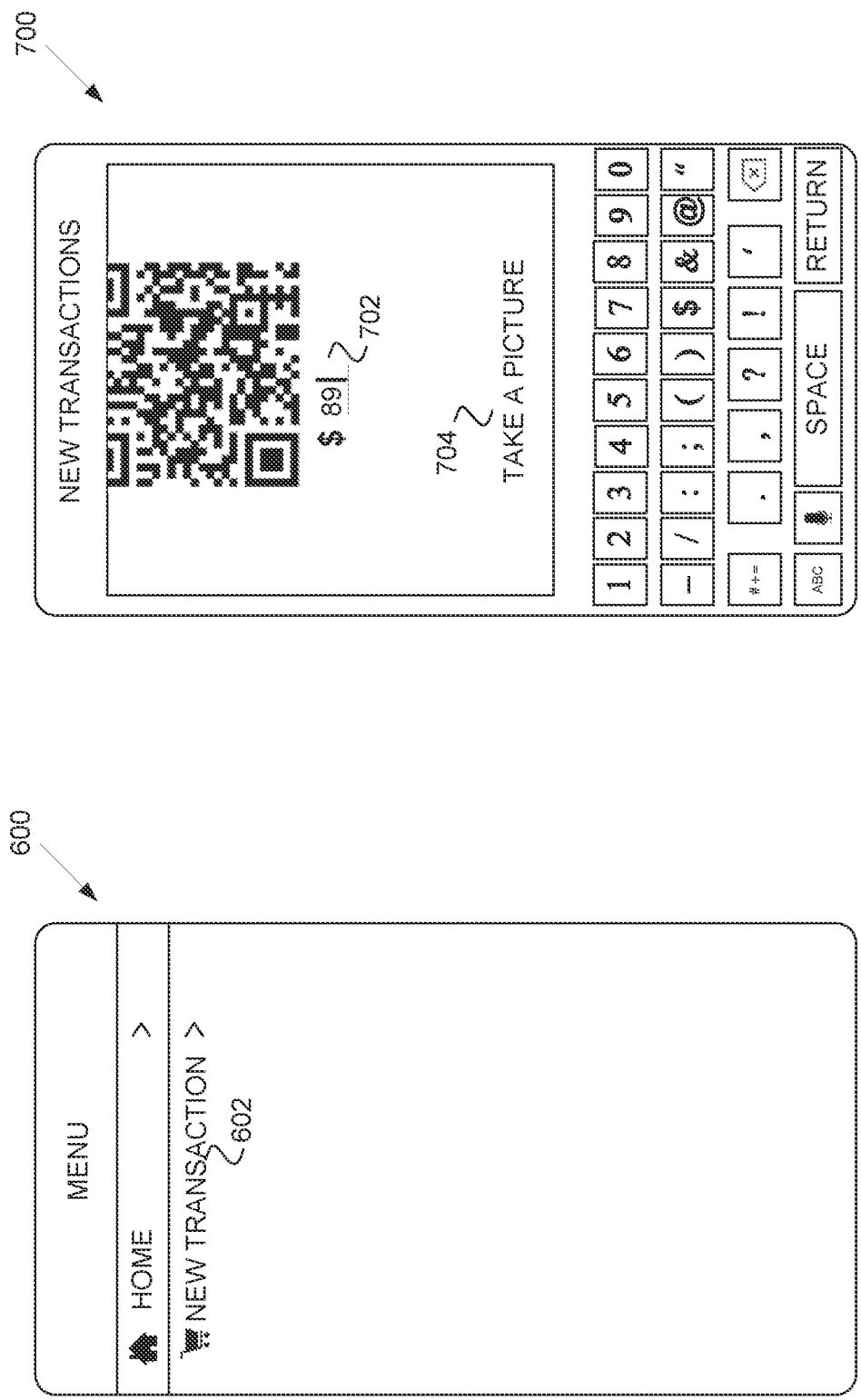

IN-PERSON TRANSACTION PROCESSING SYSTEM

CLAIM OF PRIORITY

This Application is a continuation of and claims the benefit of priority of U.S. application Ser. No. 16/787,835, filed Feb. 11, 2020, which claims the benefit of priority of U.S. Provisional Application Ser. No. 62/899,060, filed Sep. 11, 2019, which is hereby incorporated by reference in its entirety.

TECHNICAL FIELD

The subject matter disclosed herein generally relates to machines configured to manage a transactions process, and to technologies by which such special-purpose machines become improved compared to other machines that manage transaction processes. Specifically, the present disclosure addresses systems and methods that manage an in-person transaction process using a network system.

BACKGROUND

Conventionally, accepting in-person payments for small or medium-size sellers is a challenge due to point-of-sale installation and maintenance costs. Additionally, there is typically no support for cashless transactions for in-person transactions such as garage sales and farmers' market. Furthermore, reconciling online and in-person (e.g., in-store) transactions is still a challenge as both are in different eco-systems.

BRIEF DESCRIPTION OF DRAWINGS

Various ones of the appended drawings merely illustrate example embodiments of the present invention and cannot be considered as limiting its scope.

FIG. 6-FIG. 9 illustrate example user interfaces displayed on a seller device for generating and displaying the code, according to some example embodiments.

DETAILED DESCRIPTION

Figure 1:
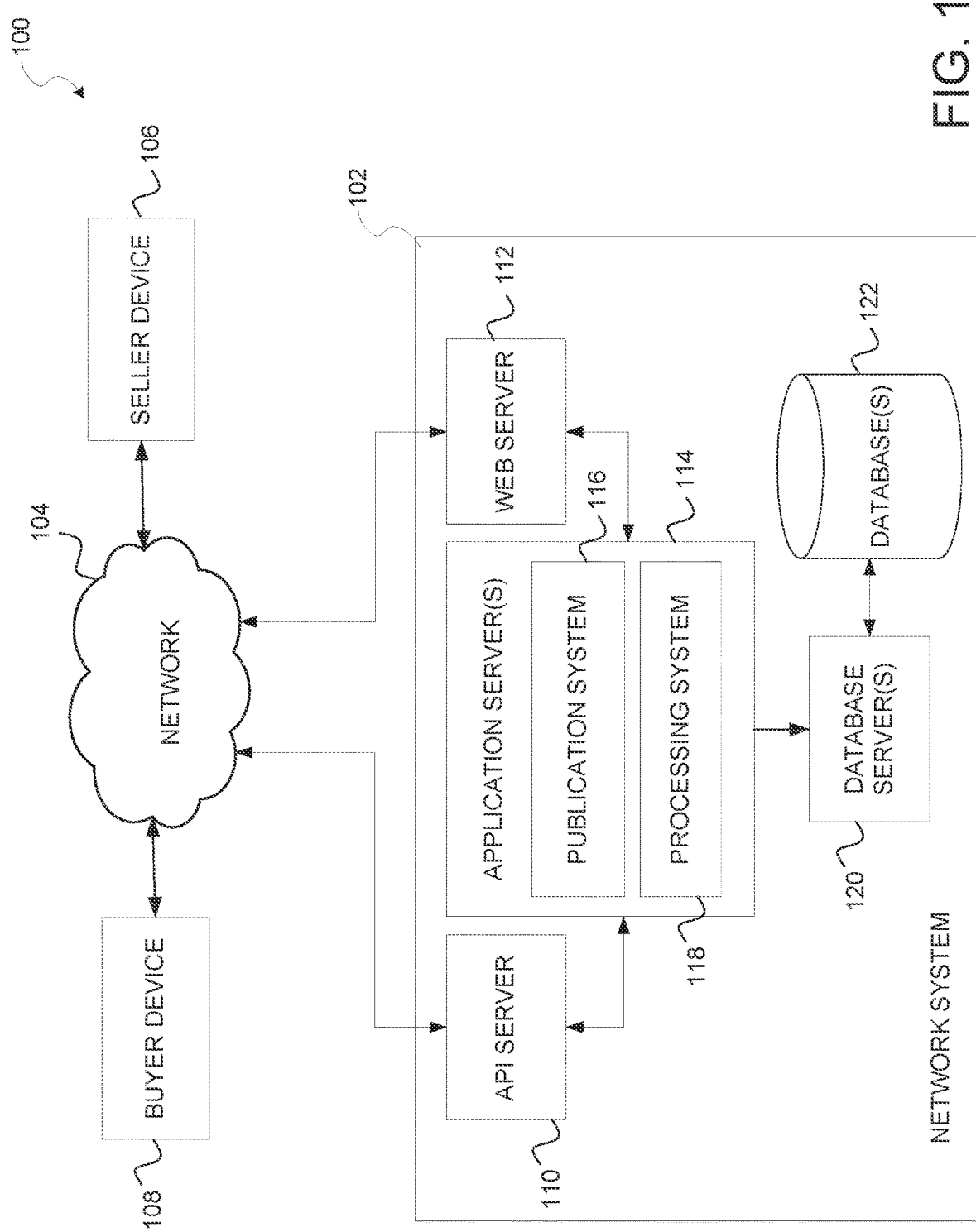
FIG. 1 is a diagram illustrating a network environment suitable for providing a system for managing an in-person transaction process, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Various systems and methods for managing an in-person transaction process using a network system are discussed herein. In example embodiments, a network system receives, from a device of a first user (e.g., a seller), information regarding a service or an item. The information can include an image of the item, title and/or description of the item or service, and an agreed-upon price. Using the received information, the network system generates an unpublished listing and associates the unpublished listing with a session identifier. The unpublished listing is then temporarily stored to a datastore. Subsequently, the network system generates a code that provides a uniform resource identifier (URI) (e.g., a uniform resource locator (URL)) associated with the session identifier. The code is displayed on the device of the first user. The code can then be scanned by a device of a second user (e.g., a buyer) to access, via the URI, a transaction user interface associated with the session identifier. In response to a request to access the transaction user interface triggered by the device of the second user scanning the code, the transaction user interface is displayed on the second user device.

In example embodiments, information and authorization to perform payment processing for the service or item is received from the device of the second user. In response to receiving the authorization to perform the payment processing, the network system performs the payment processing. Assuming the payment process is successful, an account of the first user is credited, while an account of the second user is debited. The network system stores the transaction information (e.g., in or associated with an account of the seller at the network system) such that the transaction information can later be accessed, and/or the seller can track, manage, and reconcile online and in-person (e.g., in-store) transactions.

Accordingly, the present disclosure provides technical solutions to the technical problem of managing in-person transactions using a network system that does not require a point-of-sale (POS) system or use of POS related equipment/components (e.g., credit card reader). In some embodiments, the managing of the in-person transaction is performed by generating unpublished listings (that contain all the details of the in-person transactions), generating unique codes that access the unpublished listings when scanned or entered, and providing unique user interfaces to allow the users to create, view, confirm, and authorize the in-person transaction. The unpublished listings are temporarily stored to a datastore for a predetermined amount of time or are deleted upon completion of the in-person transaction. This temporary storage of the unpublished listing (or temporary listings) allows for a reduced need for storage space. This is especially important given the sheer number of in-person transactions that can occur within a day. Further still, the unpublished listings can, in some embodiments, be stored to a cache for faster access. As a result, one or more of the methodologies described herein facilitate solving technical problems associated with managing an in-person transaction using a network system that does not require the use of a POS system or related components and that reduces the need for storage capacity. Example embodiments also provide improved security for an in-person transaction since the buyer does not need to hand over a credit card or payment information directly to the seller.

With reference to FIG. 1, an example embodiment of a network environment 100 that provides for processing in-person transactions is shown. A network system 102 provides server-side functionality via a communication network 104 (e.g., the Internet, wireless network, cellular network, or a Wide Area Network (WAN)) to a plurality of user devices including a seller device 106 and a buyer device 108.

The seller device 106 and buyer device 108 interface with the networked system 102 via a connection with the network 104. Depending on the form of each of the seller device 106 and buyer device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with the seller device 106 and buyer device 108 executing a web client (e.g., an Internet browser), which may be in communication with the network system 102. The UIs may also be associated with one or more applications (e.g., an application provided by or through the network system 102).

The seller device 106 and buyer device 108 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the seller device 106 and buyer device 108 comprise a display module (not shown) to display information (e.g., in the form of user interfaces). In further embodiments, the seller device 106 and buyer device 108 comprise one or more of a touch screen, accelerometer, camera, microphone, and Global Positioning System (GPS) device.

The seller device 106 and buyer device 108 may include one or more applications (also referred to as "apps") such as, but not limited to, a web browser, messaging application, electronic mail (e-mail) application, an e-commerce site application (also referred to as a marketplace application), third-party applications, and the like. In some embodiments, if a site application (e.g., the e-commerce site application) is included in the seller device 106 or buyer device 108, then this application is configured to locally provide the user interface and at least some of the functionalities with the application configured to communicate with the network system 102, on an as needed basis, for data or processing capabilities not locally available (e.g., to publish listings, access to a database of published listings, to authenticate a user, to provide communications with other users of the network system 102). Conversely if the site application is not included in the seller device 106 or buyer device 108, the seller device 106 or buyer device 108 may use its web browser to access a site (or a variant thereof) hosted on the network system 102.

Turning specifically to the network system 102, an application program interface (API) server 110 and a web server 112 are coupled to, and provide programmatic and web interfaces respectively to, one or more application servers 114. The application servers 114 host a publication system 116 and a processing system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or databases 122. In one embodiment, the database 122 is a storage device that stores content (e.g., publications or item listings, store information, buyer profiles including past browsing and purchase history, seller profiles) that is used by the network system 102.

In example embodiments, the publication system 116 publishes content on a network (e.g., Internet). As such, the publication system 116 provides a number of publication functions and services to users that access the network system 102. The publication system 116 will be discussed in more details in connection with FIG. 2 below.

The processing system 118 comprises one or more servers that manages an in-person transaction process. The processing system 118 will be discussed in more detail in connection with FIG. 3.

While the publication system 116 and processing system 118 are shown in FIG. 1 to form part of the network system 102, it will be appreciated that, in alternative embodiments, the publication system 116 or processing system 118 may form part of a separate service that is distinct from the network system 102. Further still, the components of the processing system 118 may, alternatively, be located within the publication system 116. Furthermore, while the client-server-based network environment 100 shown in FIG. 1 employs a client-server architecture, the present inventive subject matter is of course not limited to such an architecture and could equally well find application in a distributed or peer-to-peer architecture system, for example. The publication system 116 and processing system 118 can also be implemented as standalone software programs, which do not necessarily have networking capabilities.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 15, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of network systems 102, seller devices 106, and buyer devices 108, may be embodied within the network environment 100. Furthermore, some components or functions of the network environment 100 may be combined or located elsewhere in the network environment 100.

Figure 2:
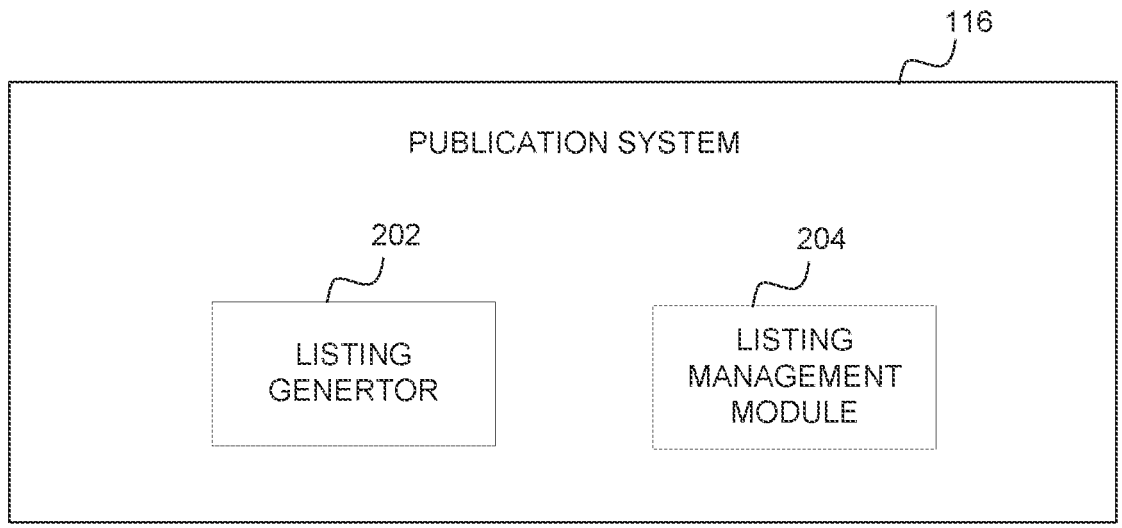
FIG. 2 is a block diagram illustrating components of a publication system, according to some example embodiments.

FIG. 2 is a block diagram illustrating components of the publication system 116, according to some example embodiments. In example embodiments, the publication system 116 publishes content on the network (e.g., Internet). As such, the publication system 116 provides a number of publication functions and services to users (e.g., of the seller device 106 and buyer device 108) that access the network system 102. For example, the publication system 116 can host a marketplace application that provides a number of functions and services to users, such as publishing listing and price-setting mechanisms whereby a seller may list (or publish information concerning) goods or services (also referred to as "items") for sale, a potential user or buyer can express interest in or indicate a desire to purchase such goods or services, and a transaction pertaining to the goods or services is processed. However, it is noted that the publication system 116 may, in alternative embodiments, be associated with a non-marketplace environment such as an informational environment (e.g., search engine) or social networking environment.

To enable these operations, the publication system 116 comprises a listing generator 202 and a listing management module 204. While the listing generator 202 and listing management module 204 are shown as being a part of the publication system 116 and in communication with the processing system 118, these components may, alternatively, be located within the processing system 118. It is noted that the publication system 116 comprises other components (not shown) that are not directly related to example embodiments and are, therefore, not discussed herein. Furthermore, any one or more of the components (e.g., modules, generators) described herein may be implemented using hardware (e.g., a processor of a machine) or a combination of hardware and software. Moreover, any two or more of these components may be combined into a single component, and the functions described herein for a single component may be subdivided among multiple components.

The listing generator 202 allow the seller to author listings or publications pertaining to items or services that they wish to transact using the networked system 102. In example embodiments, the listing generator 202 works with the processing system 118 to generate an unpublished listing that is used to process an in-person transaction. The listing is unpublished in that the listing is not visible (not published) on a public marketplace managed by the network system 102 that allows users to search for and transact for goods and services.

In example embodiments, the listing generator 202 causes presentation of one or more user interfaces to allow the seller to author the unpublished listing. Using the user interface, the seller can take a photo of an item, provide a title or description of the item, and enter an agreed upon (e.g., negotiated) price. Once the listing generator 202 receives this information, the listing generator 202 generates the unpublished listing. The listing generator 202 also associates a session identifier (ID) with the unpublished listing. The session ID is a unique identifier assigned to the unpublished listing that allows the seller and the buyer to access the unpublished listing at the network system 102. Once the unpublished listing is generated and associated with the session ID, the unpublished listing may be temporarily stored to a datastore (e.g., the database 122) until the in-person transaction is complete or a predetermined amount of time has passed. Notification of the unpublished listing may also be transmitted to the processing system 118.

The listing management module 204 manages the seller's listings. In some embodiments, the listing management module 204 may determine that a predetermined amount of time has passed since an unpublished listing was generated (e.g., 10 minutes). Because an in-person transaction is occurring relatively in real-time, the predetermined amount of time is kept short. In response to determining that the predetermined amount of time has passed, the listing management module 204 removes the unpublished listing from the datastore. By removing the unpublished listing immediately after the in-person transaction is completed or after a short predetermined amount of time, the network system 102 can save on memory space need to store and manage such listings and in-person transactions.

In some embodiments, the unpublished listing may be stored in a cache. Since the in-person transaction will occur within a short amount of time after the creation of the unpublished listing, the storing of the unpublished listing in the cache will allow for quick access to the unpublished listing.

Figure 3:
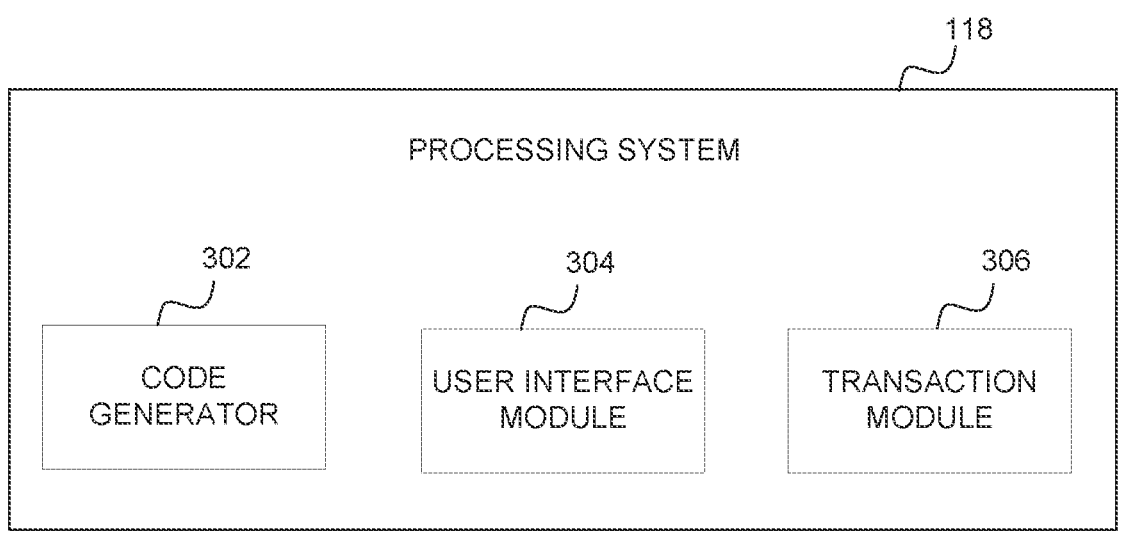
FIG. 3 is a block diagram illustrating components of a processing system, according to some example embodiments.

FIG. 3 is a block diagram illustrating components of the processing system 118, according to some example embodiments. In example embodiments, the processing system 118 comprises one or more servers that include components that manage in-person transaction processes. To enable these operations, the processing system 118 comprises a code generator 302, a user interface module 304, and a transaction module 306. The processing system 118 may also comprise other components (not shown) that are not pertinent to example embodiments. Furthermore, any one or more of the components (e.g., engines, modules, generators) described herein may be implemented using hardware (e.g., a processor of a machine) or a combination of hardware and software. Moreover, any two or more of these components may be combined into a single component, and the functions described herein for a single component may be subdivided among multiple components.

The code generator 302 generates a unique code associated with the unpublished listing that provides a URI to access the unpublished listing. In example embodiments, the code is a quick response (QR) code. However, alternative embodiments may use other types of codes or unique images that can convey information. Further still, the code may be an alphanumeric or similar code that can be entered or copied. The code encapsulates the session ID such that when the code is scanned (or entered and transmitted), the session ID can be used, by the network system 102, to access information associated with the unpublished listing.

The user interface module 304 generates user interfaces associated with managing the in-person transaction process. Accordingly, once the code is generated, the user interface module 304 generates a user interface that displays the code (referred to herein as the "code UI"). The code UI is then transmitted for display on the seller device 106.

The transaction module 306 manages the processing of the in-person transaction. In example embodiments, the buyer device 108 scans the code displayed on the code UI on the seller device 106. The scan causes a call to the processing system 118, which triggers the transaction module 306 to access the unpublished listing and cause the user interface module 304 to generate a transaction UI. The transaction UI is then transmitted to the buyer device 108. The buyer can then verify or input any necessary information and authorize the transaction (e.g., authorize payment). Upon authorization, the transaction module 306 processes the transaction and provides a transaction confirmation if the transaction is completed. Conversely, if the transaction module 306 cannot process the transaction (e.g., insufficient funds, wrong credit card information), the transaction module 306 returns, via the user interface module 304, an error message.

Figure 4:
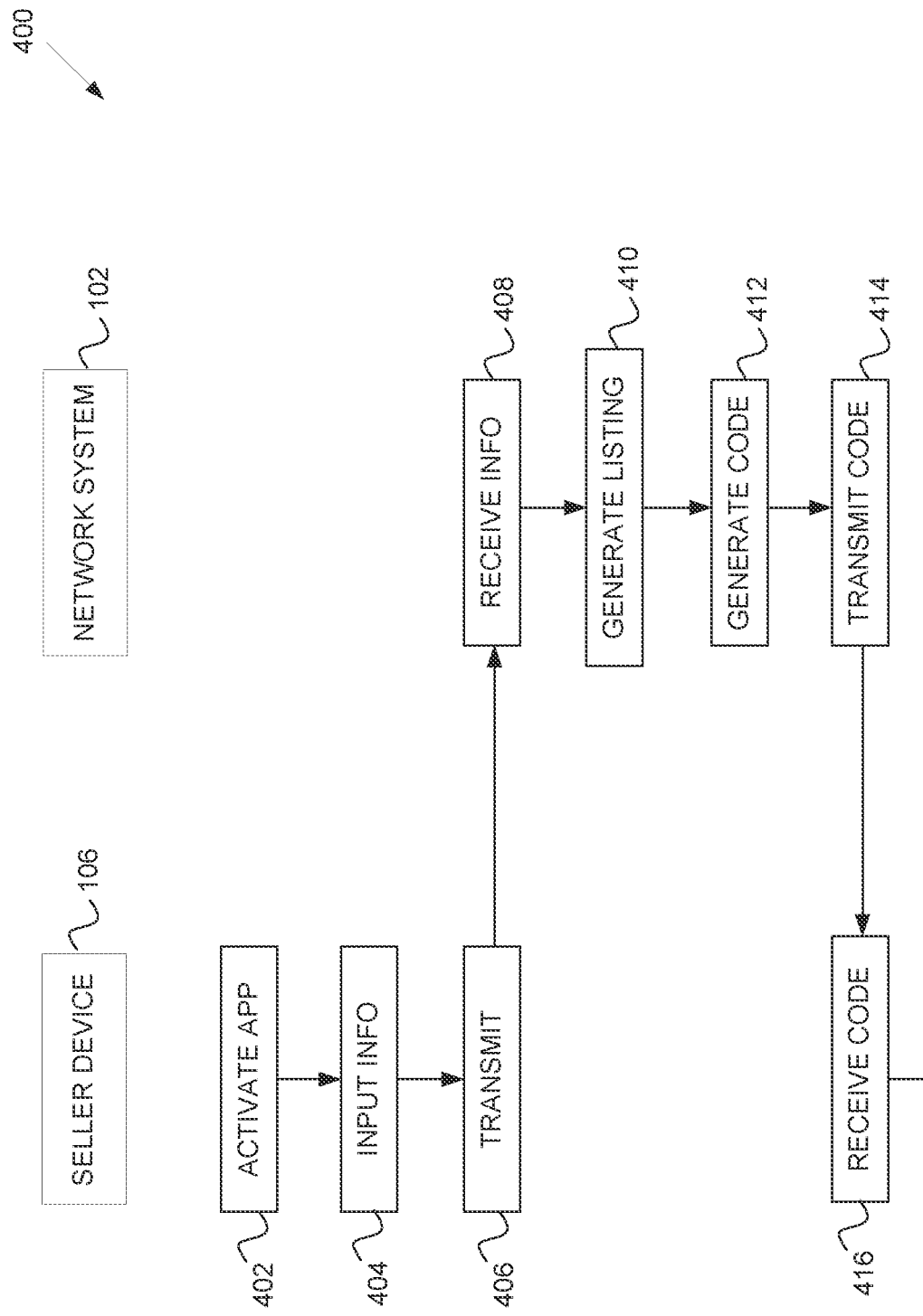
FIG. 4 is an interaction diagram illustrating a method for generating an unpublished listing and corresponding code, according to some example embodiments.

FIG. 4 is an interaction diagram illustrating a method 400 for generating an unpublished listing and a corresponding code, according to some example embodiments. The interactions of the method 400 involve the seller device 106 and components of the network system 102. Prior to the method 400, a seller and a buyer may have negotiated and/or agreed upon a price for an item or service. The negotiation may be in-person, for example, at a location of the seller (e.g., a garage sale, farmers market, kiosk, store).

At operation 402, the seller activates an application associated with the network system 102 on the seller device 106. The application may provide a listing creation user interface to the seller. Using the listing creation UI, the seller inputs information for the item in operation 404. The information may include a title or name of the item and an agreed-upon price. In some instances, the information may also include a photo or image of the item. The information is then transmitted in operation 406 to the network system 102. The transmission may also include information regarding the seller (e.g., a seller identifier).

The network system 102 receives the information in operation 408 and generates the unpublished listing in operation 410. As such, the listing generator 202 receives the information and uses the information to generate the unpublished listing. The listing generator 202 also associates the unpublished listing with the seller ID and with a session ID. The unpublished listing is then temporarily stored to a datastore.

Once the unpublished listing is generated, the code generator 302 generates a unique code (e.g., QR code, unique image, alphanumeric code) associated with the unpublished listing in operation 412. The generated code provides a URI that captures a session ID such that when the code is scanned or entered and a call made to the network system 102, the session ID is used to access (e.g., retrieve) the unpublished listing.

The generated code is then transmitted back to seller device 106 in operation 414. In example embodiment, the user interface module 304 generates a code UI that shows the generated code.

In operation 416, the seller device receives the code via the code UI. The seller device then displays the code UI on a display screen in operation 418.

Figure 5:
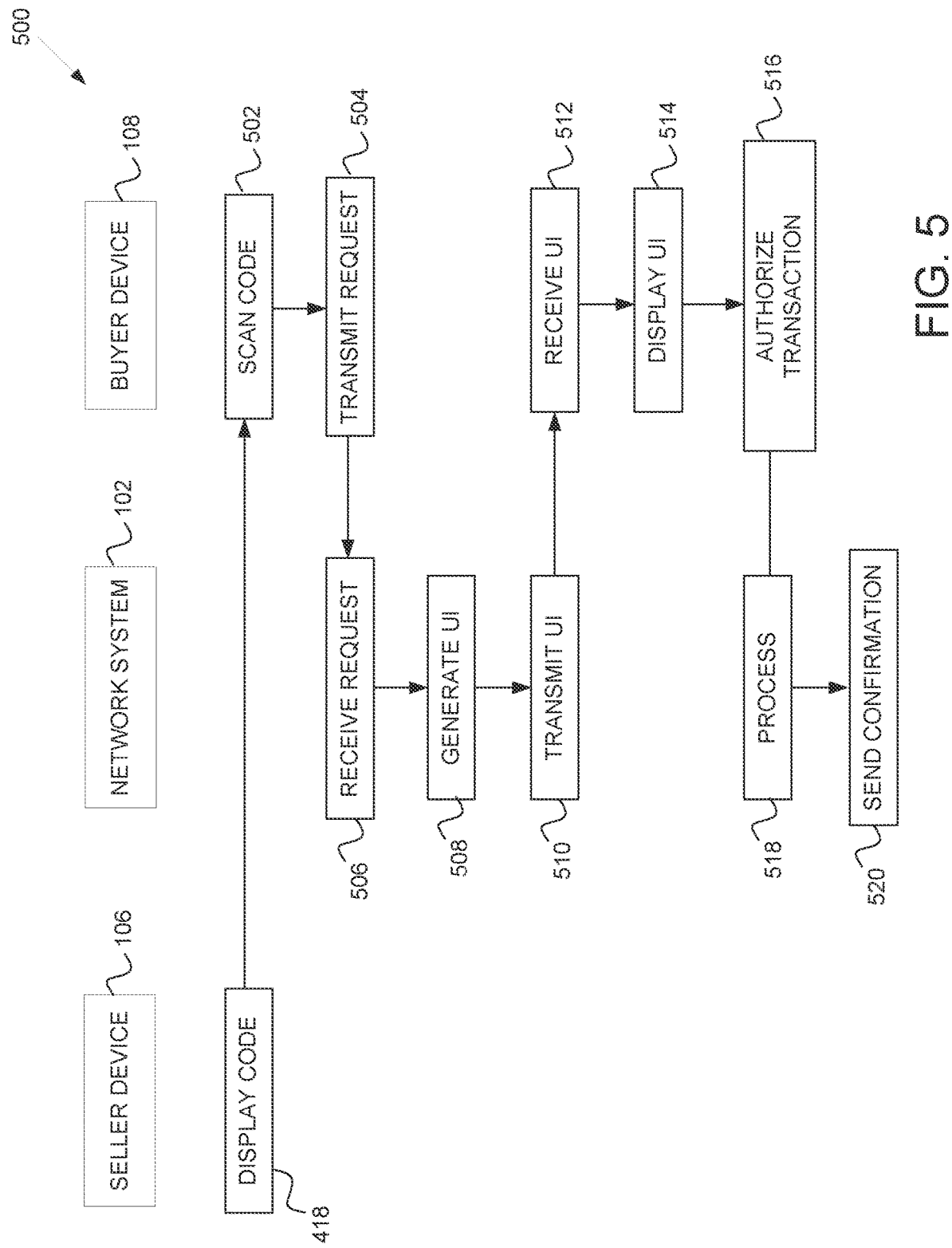
FIG. 5 is an interaction diagram illustrating a method for completing a transaction process using a network system, according to some example embodiments.

FIG. 5 is an interaction diagram illustrating a method 500 for completing an in-person transaction process using the network system 102, according to some example embodiments. The method 500 is a continuation of the method 400 of FIG. 4 that now includes operations performed by the buyer device 108.

While the seller device 106 displays the code UI in operation 418, the buyer device 108 scans the code displayed on the code UI in operation 502. In example embodiments, the buyer device 108 uses a code scanning application located on the buyer device 108. The scanning of the code causes a request to be transmitted (e.g., a call made to the network system 102) in operation 504. The request includes the session ID that was encapsulated in the code.

The network system 102 receives the request in operation 506. Using the session ID in the request, the network system 102 accesses the corresponding unpublished listing from the datastore. Using the unpublished listing (or information contained therein), the network system 102 (e.g., the user interface module 304) generates a transaction UI in operation 508. The transaction UI is transmitted to the buyer device 108 in operation 510.

The buyer device 108 receives the transaction UI in operation 512 and displays the transaction UI on a display of the buyer device 108 in operation 514. The transaction UI provides details from the unpublished listing (or displays the unpublished listing itself) including an image (if one is provided by the seller), title, description, and the agreed-upon price. The transaction UI may also display a location of the item or service (e.g., a map, an address).

Using the transaction UI, the buyer can then verify the transaction, input any necessary information (e.g., where to send a receipt), and authorize the transaction in operation 516. For example, the buyer can input or select contact information (e.g., e-mail address) where a receipt or payment confirmation should be sent. The buyer may also provide or select payment information. In some embodiments, the buyer can also apply a coupon or discount (e.g., enter or scan a coupon) or provide a tip via the transaction UI.

When all the information is entered, selected, or updated by the buyer, the buyer authorizes the transactions (e.g., provide indication to perform payment processing), the authorization is transmitted (operation 516) to the network system 102. Once received, the network system 102 processes the transaction in operation 518. In some embodiments, the network system 102 attempts to debit the buyer's account and credit the seller's account for the agreed upon price.

If the processing is successful, payment confirmations are sent in operation 520. As such, each of the seller device 106 and buyer device 108 may receive a payment confirmation notification. The payment confirmation notification may be a confirmation UI displayed on the respective devices 106 and 108. Alternatively or additionally, the confirmation notification can be an e-mail or text to an account associated with the seller or buyer. If the processing is unsuccessful (e.g., denied by a payment service), an error message is returned to the buyer device 108 (and may also be returned to the seller device 106) and the buyer can attempt to use a different payment mechanism with the network system 102 (e.g., a different credit card or payment service). Once the transaction is completed or after a predetermined amount of time has passed, the unpublished listing is removed from the datastore.

FIG. 6-FIG. 9 illustrate example user interfaces displayed on the seller device 106 that are used for generating an unpublished listing and displaying a code for use in an in-person transaction process performed by the network system 102, according to some example embodiments. FIG. 6 shows a menu user interface (UI) 600 that is presented when an application associated with the network system 102 is activated on the seller device 106. The menu UI 600 provides a new transaction icon 602 for initiating the in-person transaction process.

Upon selection of the new transaction icon 602, a new transaction UI 700, as shown in FIG. 7, is displayed on the seller device 106. The new transaction UI 700 provides one or more fields to input information. For example, the seller can enter an agreed-upon price in a price field 702. The seller may also enter a title of the item and/or description of the item.

Figure 8:
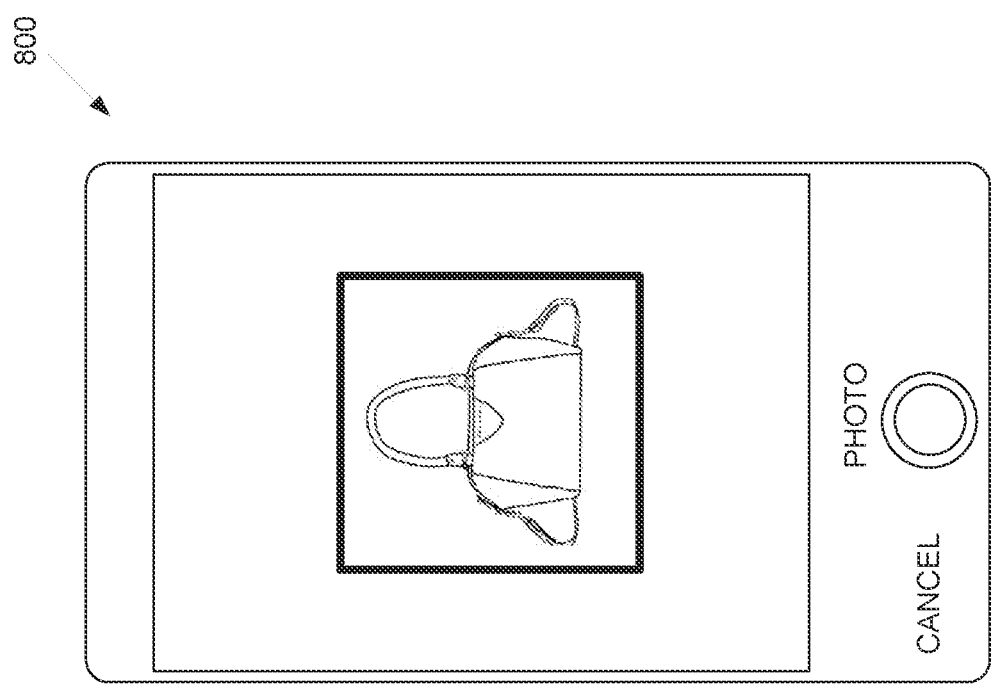

The transaction UI 700 also includes an indication 704 to take a picture of the item. In various embodiments, the picture is optional. In response to the selection of the indication 704 to take the picture, a camera UI 800 is presented by the application as shown in FIG. 8. Using the camera UI 800, the seller captures an image of the item that is being transacted.

Once the information is input by the seller, the information and image are transmitted, by the application, to the network system 102. The network system 102 identifies the seller (e.g. from information associated with the application or the seller device 106) and associates a session ID with the in-person transaction. Using the information along with the identified seller information, the network system 102 generates an unpublished listing. The unpublished listing is temporarily stored to a datastore at the network system 102.

Figure 9:
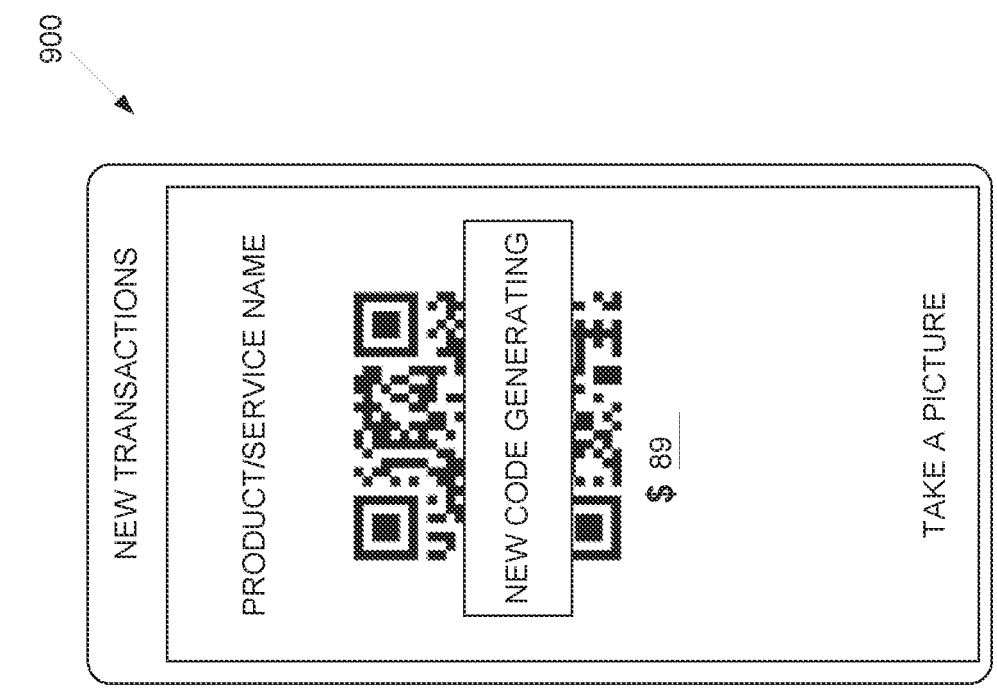

Once the unpublished listing is generated, the network system generates a corresponding unique code that includes (e.g., encapsulates) the session ID linked to the unpublished listing. FIG. 9 illustrates a code generation UI 900 displayed on the seller device. The code generation UI 900 provides notification to the seller that the unpublished listing and code are being generated by the network system 102.

Once the code is generated, the network system provides a code UI for display on the seller device 106. The code UI includes an image of the generated code that is uniquely linked to the unpublished listing by the session ID that is encapsulated within the code.

Figure 10:
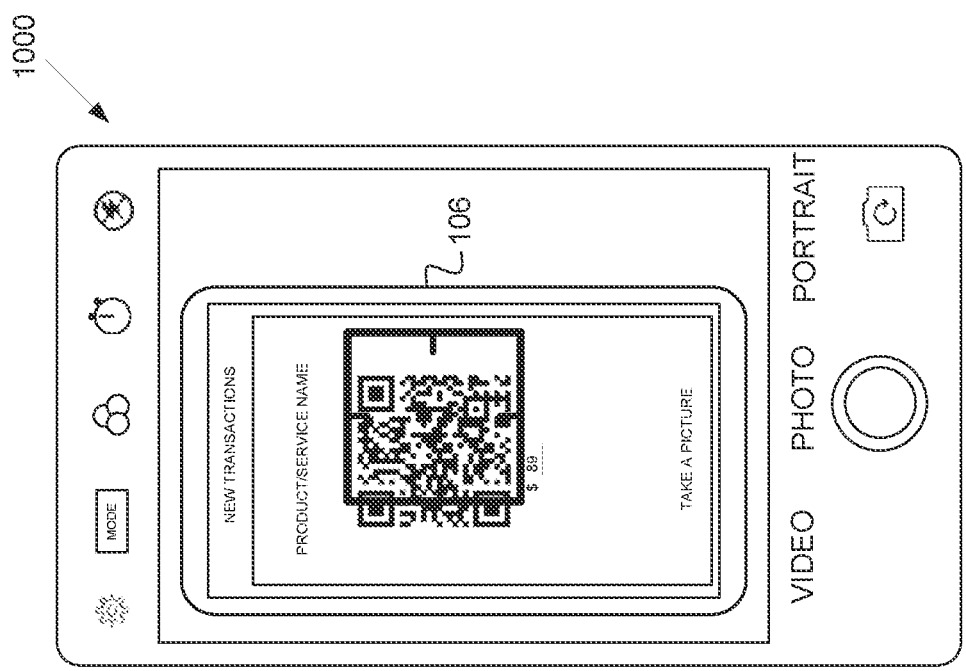

FIG. 10-FIG. 14 illustrate example user interfaces displayed on the buyer device 108 that are used for authorizing the in-person transaction, according to some example embodiments. Referring to FIG. 10, a scan capture UI 1000 is shown displayed on the buyer device 108. The scan capture UI 1000 may be provided by any code scanning application that is accessible by the buyer device 108. Using the scan capture UI 1000, the buyer can capture an image of the code that is displayed in the scan UI on the seller device 106.

Figure 11:
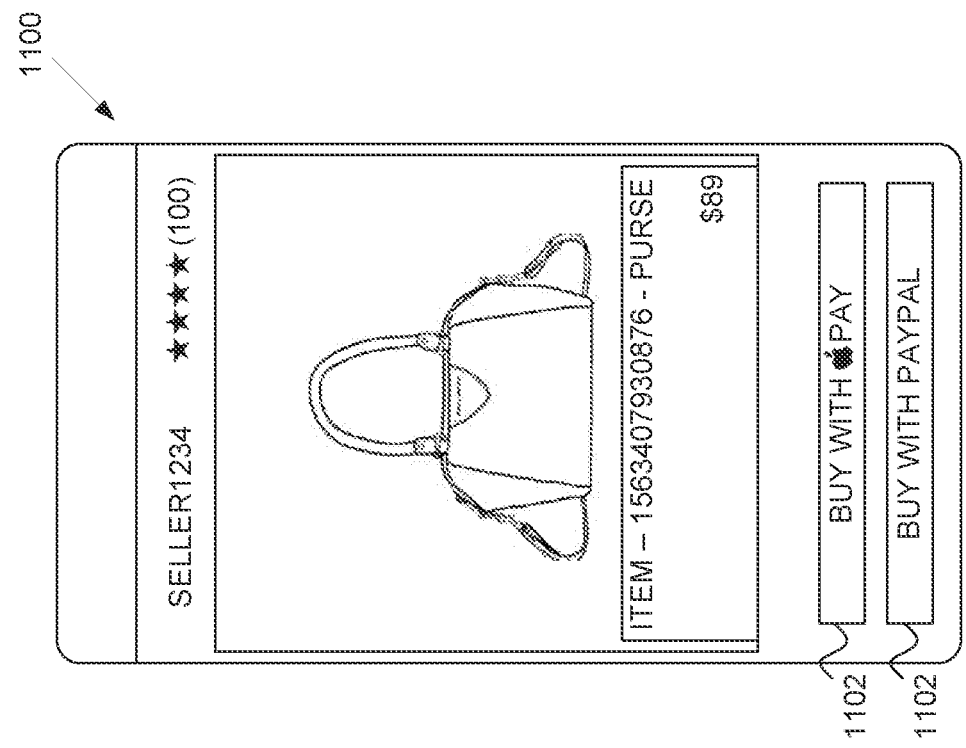
FIG. 10-FIG. 14 illustrate example user interfaces displayed on a buyer device for authorizing the in-person transaction, according to some example embodiments.

Capturing the code automatically triggers a request (e.g., a call) from the buyer device 108 to the network system 102 to access the unpublished listing associated with the session ID. The network system 102 uses the session ID from the request to access the unpublished listing and generates a transaction processing UI 1100 for display on the buyer device 108. The buyer device 108 receives the transaction processing UI 1100 and displays it as shown in FIG. 11. The transaction processing UI 1100 is a scrollable UI that presents the unpublished listing (or information from the unpublished listing) and provides fields that allows the buyer to input or confirm contact information and payment information. The transaction processing UI 1100 may also allow the buyer to apply a discount, coupon, or tip. As shown in FIG. 11, the transaction processing UI 1100 includes a display of an image of the item if one was taken by the buyer. Additionally, a title and/or description of the item along with the agreed-upon price are displayed. In example embodiments, one or more payment icons 1102 are also provided on the transaction processing UI 1100. The payment icons 1102 trigger payment using a payment service.

Figures 12, 13:
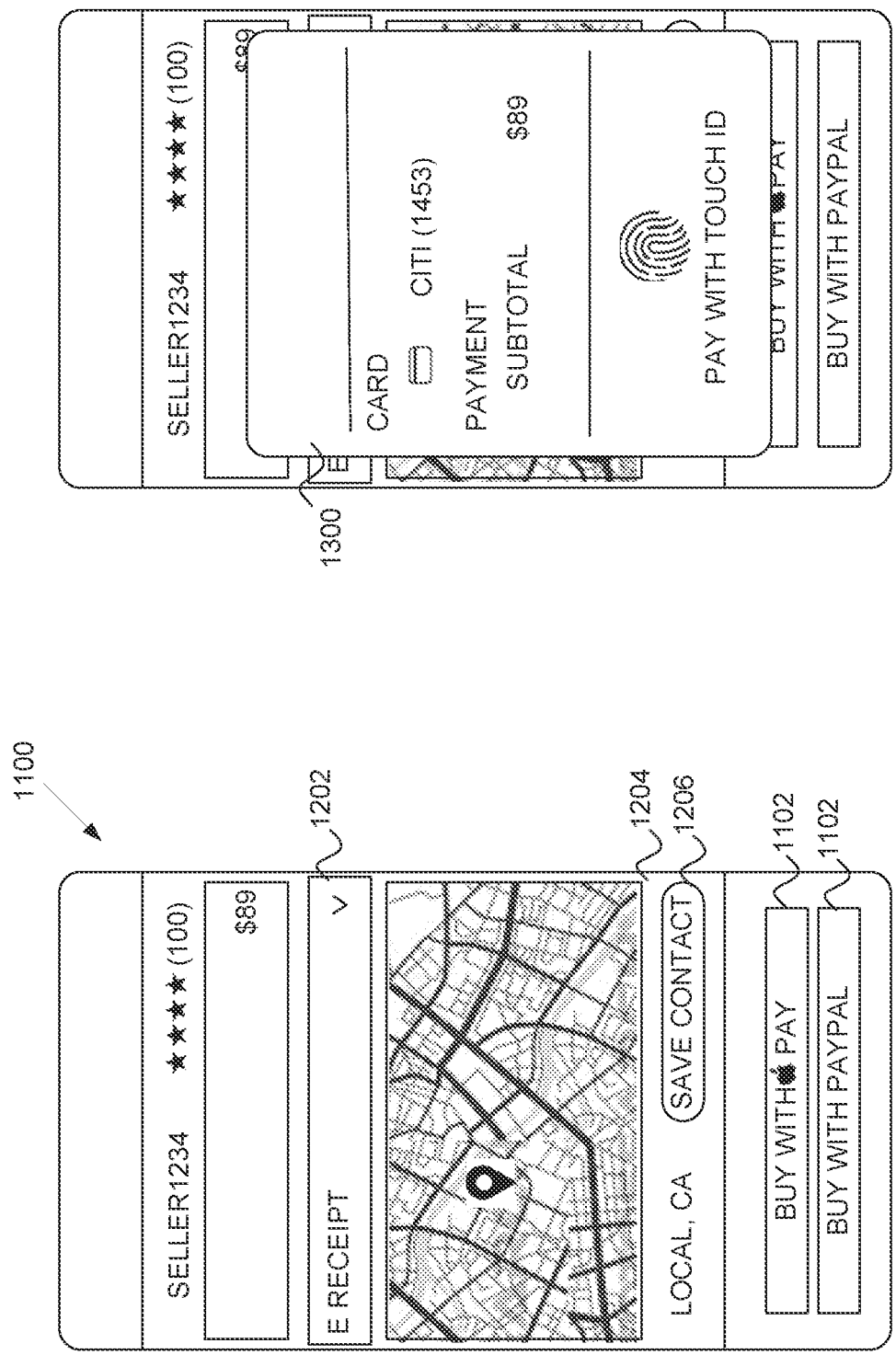
Figure 14:
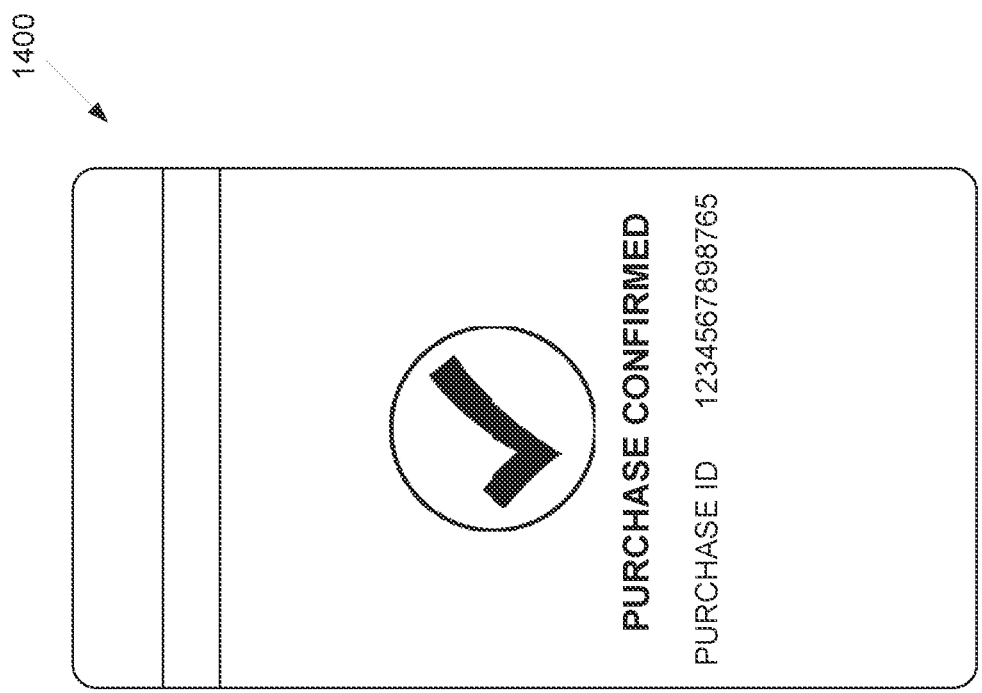

FIG. 12 illustrates the transaction processing UI 1100 scrolled up (e.g., pass the displayed image). The transaction processing UI 1100 now shows a receipt input selection 1202 and a map section 1204. Activating the receipt input selection 1202 provides access to a contact field (not shown) where the buyer can enter contact information for where (e.g., an e-mail address) or how (e.g., via text) they would like to receive their receipt for the in-person transaction. Alternatively, activation of the receipt input selection 1202 may provide a menu of contact information from which the buyer can select from for where the receipt should be sent. In some embodiments, the receipt input selection 1202 may be optional and the recipient may be sent based on settings with the respective payment service (e.g., ApplePay, PayPal, GooglePay).

The map section 1204 shows a location where the in-person transaction is occurring. The map section 1204 also provides a save contact selection 1206 that allows the buyer to save location information for the location (e.g., address, phone number). In some embodiments, the map section 1204 may be optional or not provided.

As discussed above, the transaction processing UI 1100 may also provide fields for applying a coupon, discount, or tip. As such, further scrolling of the transaction processing UI 1100 will provide access to these fields.

At any time, the buyer can select one of the payment icons 1102. The payment icon 1102 triggers a payment processing process at the network system 102. The number and types of payment icons 1102 displayed to the buyer depends on payment options that the buyer has established on the buyer device 108 and/or with the network system 102. For example, if the buyer has established an Apple Pay account, a corresponding payment icon 1102 is displayed. Alternatively, if the buyer has set up credit card payment information with the network system 102, a credit card payment icon can be displayed.

Upon selection of one of the payment icons 1102, a payment processing UI 1300 is presented to the buyer as shown in FIG. 13. The buyer can confirm information associated with the selected payment type and authorized the payment. While the payment processing UI 1300 is shown as a popover user interface, alternative embodiments may replace the transaction processing 1100 with the payment processing UI 1300.

Once the payment is processed by the network system 102, a transaction confirmation UI 1400 is displayed to the buyer. Additionally, if the buyer had indicated a desire to receive an e-receipt (e.g., via the receipt input selection 1202 of FIG. 12), an e-receipt is transmitted to the indicated e-mail address or number. Furthermore, a similar transaction confirmation UI may be transmitted by the network system 102 to the seller device 106 and/or confirmation message transmitted to an indicated e-mail address or number. Additionally, the network system 102 stores transaction information to (or associated with) an account of the seller that is managed by the network system 102. This allows the network system 102 (and buyer) to track, monitor, and reconcile the in-person transactions with online transactions performed by the network system 102.

Figure 15:
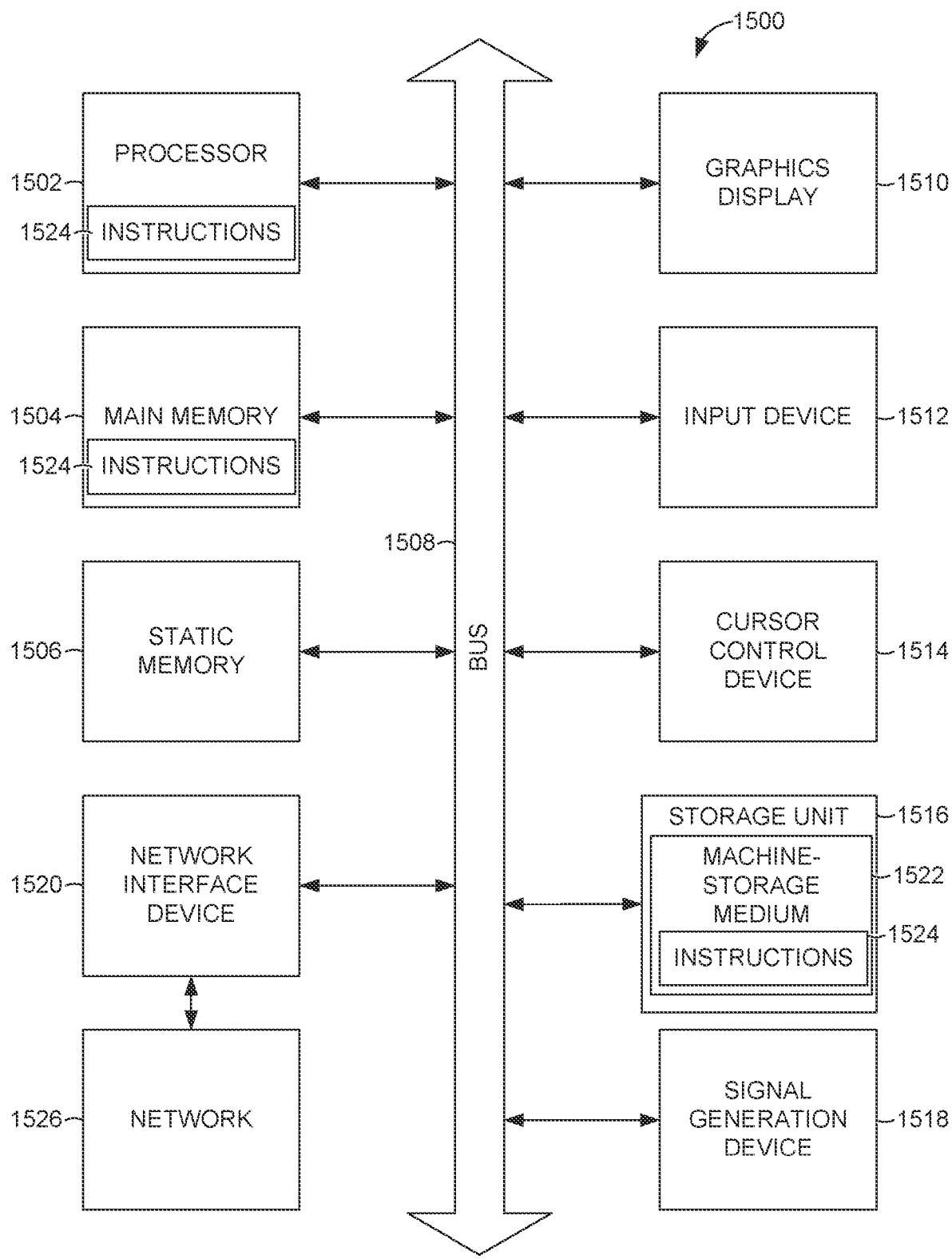
FIG. 15 is a block diagram illustrating components of a machine, according to some example embodiments, able to read instructions from a machine-storage medium and perform any one or more of the methodologies discussed herein.

FIG. 15 illustrates components of a machine 1500, according to some example embodiments, that is able to read instructions from a machine-storage medium (e.g., a machine storage device, a non-transitory machine-readable storage medium, a computer storage medium, or any suitable combination thereof) and perform any one or more of the methodologies discussed herein. Specifically, FIG. 15 shows a diagrammatic representation of the machine 1500 in the example form of a computer device (e.g., a computer) and within which instructions 1524 (e.g., software, a program, an application, an apples, an app, or other executable code) for causing the machine 1500 to perform any one or more of the methodologies discussed herein may be executed, in whole or in part.

For example, the instructions 1524 may cause the machine 1500 to execute the communication flow and interaction operations of FIG. 4 and FIG. 5. In one embodiment, the instructions 1524 can transform the general, non-programmed machine 1500 into a particular machine (e.g., specially configured machine) programmed to carry out the described and illustrated functions in the manner described.

In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524 (sequentially or otherwise) that specify actions to be taken by that machine. Further, while only a single machine is illustrated, the term "machine" shall also be taken to include a collection of machines that individually or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain microcircuits that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein.

The machine 1500 may further include a graphics display 1510 (e.g., a plasma display panel (PDP), a light emitting diode (LED) display, a liquid crystal display (LCD), a projector, or a cathode ray tube (CRT), or any other display capable of displaying graphics or video). The machine 1500 may also include an input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a sound card, an amplifier, a speaker, a headphone jack, or any suitable combination thereof), and a network interface device 1520.

The storage unit 1516 includes a machine-storage medium 1522 (e.g., a tangible machine-readable storage medium) on which is stored the instructions 1524 (e.g., software) embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered as machine-readable media (e.g., tangible and non-transitory machine-readable media). The instructions 1524 may be transmitted or received over a network 1526 via the network interface device 1520.

In some example embodiments, the machine 1500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1504, 1506, and/or memory of the processor(s) 1502) and/or storage unit 1516 may store one or more sets of instructions and data structures (e.g., software) 1524 embodying or utilized by any one or more of the methodologies or functions described herein. These instructions, when executed by processor(s) 1502 cause various operations to implement the disclosed embodiments.

As used herein, the terms "machine-storage medium," "device-storage medium," "computer-storage medium" (referred to collectively as "machine-storage medium 1522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1522 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1524 may further be transmitted or received over a communications network 1526 using the transmission medium via the network interface device 1520 and utilizing any one of a number of well-known transfer protocols (e.g., HTTP). Examples of communication networks 1526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1524 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing an in-person transaction process. The method comprises receiving, at a network system from a device of a first user, information regarding a service or an item; using the received information, generating, by a hardware processor of the network system, an unpublished listing, the unpublished listing being associated with a session identifier and temporarily stored to a datastore associated with the network system; generating, by the network system, a scannable code that provides a uniform resource identifier (URI) associated with the session identifier; causing presentation, by the network system, of the scannable code at the device of the first user, the scannable code to be scanned by a device of a second user to access, via the URI, a transaction user interface associated with the session identifier; and in response to a request to access the transaction user interface triggered by the device of the second user scanning the scannable code, causing presentation, by the network system, of the transaction user interface on the device of the second user.

In example 2, the subject matter of example 1 can optionally include wherein the scannable code comprises a quick response (QR) code.

In example 3, the subject matter of any of examples 1-2 can optionally include determining that a predetermined amount of time has passed since the generating of the unpublished listing; and in response to the determining, removing the unpublished listing from the datastore.

In example 4, the subject matter of any of examples 1-3 can optionally include wherein the transaction user interface comprises a display of a location of the service or item.

In example 5, the subject matter of any of examples 1-4 can optionally include wherein the received information includes an image of the item and a price and the transaction page includes the image of the item, the price, and a selectable option to initiate a payment process.

In example 6, the subject matter of any of examples 1-5 can optionally include wherein the received information includes a coupon, discount, or tip to be applied to the service or item.

In example 7, the subject matter of any of examples 1-6 can optionally include receiving, from the device of the second user via the transaction user interface, an indication to perform payment processing for the service or item; in response to the receiving, performing the payment processing; and responsive to the payment processing being successful, updating an account of the first user with the network system that tracks transaction histories.

In example 8, the subject matter of any of examples 1-7 can optionally include receiving, from the device of the second user via the transaction user interface, an indication of where to transmit a receipt resulting from the payment processing.

In example 9, the subject matter of any of examples 1-8 can optionally include receiving, from the device of the second user via the transaction user interface, a tip to be applied during the payment processing.

In example 10, the subject matter of any of examples 1-9 can optionally include receiving, from the device of the second user via the transaction user interface, a coupon to be applied during the payment processing.

In example 11, the subject matter of any of examples 1-10 can optionally include responsive to the payment processing being successful, removing the unpublished listing from the datastore.

In example 12, the subject matter of any of examples 1-11 can optionally include wherein the unpublished listing comprises a temporary listing that is not published by the network system.

Example 13 is a system for managing an in-person transaction process. The system includes one or more hardware processors and a storage device storing instructions that, when executed by the one or more hardware processors, causes the one or more hardware processors to perform operations comprising receiving, from a device of a first user, information regarding a service or an item; using the received information, generating an unpublished listing, the unpublished listing being associated with a session identifier and temporarily stored to a datastore associated with the network system; generating a scannable code that provides a uniform resource identifier (URI) associated with the session identifier; causing presentation of the scannable code at the device of the first user, the scannable code to be scanned by a device of a second user to access, via the URI, a transaction user interface associated with the session identifier; and in response to a request to access the transaction user interface triggered by the device of the second user scanning the scannable code, causing presentation of the transaction user interface on the device of the second user.

In example 14, the subject matter of example 13 can optionally include wherein the scannable code comprises a quick response (QR) code.

In example 15, the subject matter of any of examples 13-14 can optionally include determining that a predetermined amount of time has passed since the generating of the unpublished listing; and in response to the determining, removing the unpublished listing from the datastore.

In example 16, the subject matter of any of examples 13-15 can optionally include the received information includes an image of the item and a price; and the transaction page includes the image of the item, the price, and a selectable option to initiate a payment process.

In example 17, the subject matter of any of examples 13-16 can optionally include receiving, from the device of the second user via the transaction user interface, an indication to perform payment processing for the service or item; in response to the receiving, performing the payment processing; and responsive to the payment processing being successful, updating an account of the first user with the network system that tracks transaction histories In example 18, the subject matter of any of examples 13-17 can optionally receiving, from the device of the second user via the transaction user interface, an indication of where to transmit a receipt resulting from the payment processing include.

In example 19, the subject matter of any of examples 13-18 can optionally include responsive to the payment processing being successful, removing the unpublished listing from the datastore.

Example 20 is a machine-storage medium for managing an in-person transaction process. The machine-storage medium configures one or more processors to perform operations comprising receiving, from a device of a first user, information regarding a service or an item; using the received information, generating an unpublished listing, the unpublished listing being associated with a session identifier and temporarily stored to a datastore associated with the network system; generating a scannable code that provides a uniform resource identifier (URI) associated with the session identifier; causing presentation of the scannable code at the device of the first user, the scannable code to be scanned by a device of a second user to access, via the URI, a transaction user interface associated with the session identifier; and in response to a request to access the transaction user interface triggered by the device of the second user scanning the scannable code, causing presentation of the transaction user interface on the device of the second user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and datastores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for managing an in-person transaction, the method comprising:

receiving, at a network system from a first user device, information regarding a service or an item;

using the received information, generating, by a hardware processor of the network system, an unpublished listing;

temporarily storing the unpublished listing in a datastore associated with the network system until completion of the in-person transaction or a predetermined amount of time has passed;

generating, by the network system, a code associated with the unpublished listing;

in response to generating the code, causing presentation, by the network system, of the code at the first user device, the code to be entered at a second user device to access a transaction user interface associated with the unpublished listing;

in response to receiving a request based on the code being entered on the second user device, causing presentation, by the network system, of the transaction user interface on the second user device;

receiving, from the second user device via the transaction user interface, an indication to perform payment processing for the service or the item;

in response to receiving the indication, triggering the payment processing; and responsive to the completion of the in-person transaction, automatically deleting the unpublished listing from the datastore.

2. The method of claim 1, wherein the code comprises a scannable code that is scannable by the second user device to access the transaction user interface.

3. The method of claim 1, further comprising:
associating a session identifier with the unpublished listing, wherein the code encapsulates the session identifier such that when the code is entered, the session identifier can be used to access information associated with the unpublished listing.

4. The method of claim 1, wherein the code is a quick response (QR) code or a unique image that conveys information.

5. The method of claim 1, wherein the code is an alphanumeric code that can be entered or copied.

6. The method of claim 1, further comprising:
determining that the predetermined amount of time has passed since the generating of the unpublished listing; and in response to the determining, removing the unpublished listing from the datastore.

7. The method of claim 1, wherein the causing presentation of the transaction user interface comprises causing a display of a location of the service or item on a map displayed on the transaction user interface.

8. The method of claim 1, wherein:
the received information includes an image of the item taken by a camera associated with the first user device and a price; and the transaction user interface displays the image of the item, the price, and a selectable option to initiate a payment process.

9. The method of claim 1, further comprising:
receiving, from the second user device via the transaction user interface, an indication of where to transmit a receipt resulting from the payment processing.

10. The method of claim 1, further comprising:
receiving, from the second user device via the transaction user interface, an indication of a tip or coupon to be applied during the payment processing.

11. The method of claim 1, wherein the transaction user interface comprises a scrollable user interface that presents information from the unpublished listing and one or more fields to input information.

12. The method of claim 1, wherein the unpublished listing is a temporary listing that is not published on a publicly accessible marketplace.

13. The method of claim 1, wherein the transaction user interface is associated with an in-person transaction without use of a point-of-sale (POS) equipment.

14. A system for managing an in-person transaction, the system comprising:
one or more hardware processors; and
a storage device storing instructions that, when executed by the one or more hardware processors, causes the one or more hardware processors to perform operations comprising:
receiving, from a first user device, information regarding a service or an item;

using the received information, generating an unpublished listing;

temporarily storing the unpublished listing in a datastore until completion of the in-person transaction or a predetermined amount of time has passed;

generating a code associated with the unpublished listing;

in response to generating the code, causing presentation of the code at the first user device, the code to be entered at a second user device to access a transaction user interface associated with the unpublished listing;

in response to receiving a request based on the code being entered on the second user device, causing presentation of the transaction user interface on the second user device;

receiving, from the second user device via the transaction user interface, an indication to perform payment processing for the service or the item;

in response to receiving the indication, performing the payment processing; and responsive to the completion of the in-person transaction, automatically deleting the unpublished listing from the datastore, automatically deleting the unpublished listing from the datastore.

15. The system of claim 14, wherein the code comprises a scannable code that is scannable by the second user device to access the transaction user interface.

16. The system of claim 14, wherein the operations further comprise:
associating a session identifier with the unpublished listing, wherein the code encapsulates the session identifier such that when the code is entered, the session identifier can be used to access information associated with the unpublished listing.

17. The system of claim 14, wherein the code comprises a quick response (QR) code, a unique image that conveys information, or an alphanumeric code.

18. The system of claim 14, further comprising:
determining that the predetermined amount of time has passed since the generating of the unpublished listing; and in response to the determining, removing the unpublished listing from the datastore.

19. The system of claim 14, wherein the transaction user interface comprises a scrollable user interface that presents information from the unpublished listing and one or more fields to input information.

20. A machine-storage medium storing instructions that, when executed by one or more processors of a machine, cause the one or more processors to perform operations for managing an in-person transaction, the operations comprising:
receiving, from a first user device, information regarding a service or an item;

using the received information, generating an unpublished listing;

temporarily storing the unpublished listing in a datastore until completion of the in-person transaction or a predetermined amount of time has passed;

generating a code associated with the unpublished listing;

in response to generating the code, causing presentation of the code at the first user device, the code to be entered at a second user device to access a transaction user interface associated with the unpublished listing;

in response to receiving a request based on the code being entered on the second user device, causing presentation of the transaction user interface on the second user device;

receiving, from the second user device via the transaction user interface, an indication to perform payment processing for the service or the item;

in response to receiving the indication, performing the payment processing; and responsive to the completion of the in-person transaction, automatically deleting the unpublished listing from the datastore.

\* \* \* \* \*